United States Patent
Kris et al.

(10) Patent No.: US 8,856,406 B2
(45) Date of Patent: Oct. 7, 2014

(54) PERIPHERAL TRIGGER GENERATOR

(75) Inventors: Bryan Kris, Gilbert, AZ (US); Michael Catherwood, Georgetown, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 13/613,784

(22) Filed: Sep. 13, 2012

(65) Prior Publication Data

US 2014/0075052 A1     Mar. 13, 2014

Related U.S. Application Data

(60) Provisional application No. 61/534,619, filed on Sep. 14, 2011.

(51) Int. Cl.
*G06F 13/12*     (2006.01)
*G06F 13/00*     (2006.01)

(52) U.S. Cl.
USPC .................................. 710/48; 710/5; 710/260

(58) Field of Classification Search
CPC ................................. G06F 13/12; G06F 13/00
USPC .......... 710/5–6, 36–49, 260; 714/724, 744, 33
See application file for complete search history.

(56) References Cited

U.S. PATENT DOCUMENTS

| | | | |
|---|---|---|---|
| 5,299,189 A | 3/1994 | Takahashi | 370/442 |
| 5,751,735 A * | 5/1998 | Tobin et al. | 714/733 |
| 6,112,318 A * | 8/2000 | Jouppi et al. | 714/47.1 |
| 6,145,020 A | 11/2000 | Barnett | 710/8 |
| 7,017,091 B2 * | 3/2006 | West | 714/724 |
| 7,114,114 B1 * | 9/2006 | Burlison et al. | 714/744 |
| 7,353,300 B2 | 4/2008 | Schumacher | 710/30 |
| 7,591,187 B2 * | 9/2009 | Hamel | 73/778 |
| 7,765,323 B2 * | 7/2010 | Kambhatla | 709/245 |
| 2007/0050691 A1 * | 3/2007 | Ramos et al. | 714/724 |
| 2008/0147923 A1 * | 6/2008 | Renahy et al. | 710/62 |
| 2009/0006934 A1 * | 1/2009 | Horley et al. | 714/819 |
| 2009/0129537 A1 * | 5/2009 | Rao et al. | 378/4 |
| 2009/0160835 A1 * | 6/2009 | Lee et al. | 345/208 |
| 2012/0310672 A1 * | 12/2012 | Steusloff et al. | 705/3 |
| 2013/0198571 A1 * | 8/2013 | Brewerton et al. | 714/37 |

OTHER PUBLICATIONS

International Search Report and Written Opinion, Application No. PCT/US2012/055268, 7 pages, Jan. 30, 2013.

* cited by examiner

*Primary Examiner* — Christopher Shin
(74) *Attorney, Agent, or Firm* — King & Spalding L.L.P.

(57) ABSTRACT

A microcontroller includes a central processing unit (CPU); a plurality of peripheral units; and a peripheral trigger generator comprising a user programmable state machine, wherein the peripheral trigger generator is configured to receive a plurality of input signals and is programmable to automate timing functions depending on at least one of said input signals and generate at least one output signal.

24 Claims, 10 Drawing Sheets

| STEP COMMAND BYTE: | | | |
|---|---|---|---|
| CMD[3:0] | | OPTION[3:0] | |
| BIT 7 | BIT 4 | BIT 3 | BIT 0 |

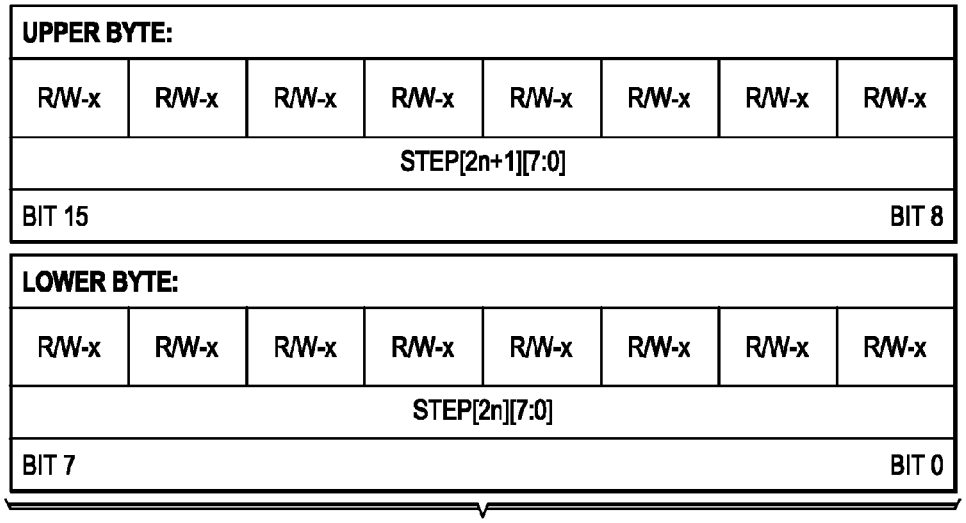

FIG. 4

```
STEP COMMANDS IN PTGQUE
;  OUTER LOOP
STEP0:   PTGWHI    0x1    ;WAIT FOR POS EDGE TRIGGER #1
STEP1:   PTGCTRL   0x8    ;START PTGT0, WAIT FOR TIMEOUT
STEP2:   PTGIRQ    0x1    ;GENERATE IRQ #1
;  INNER LOOP
STEP3:   PTGTRIG   0x03   ;GENERATE OUTPUT TRIGGER #3
STEP4:   PTGCTRL   0x9    ;START PTGT1, WAIT FOR TIMEOUT
STEP5:   PTGJMPC0  0x03   ;JUMP TO STEP3 IF PTGC0 ! = PTGC0LIM, INCREMENT PTGC0
;  END INNER LOOP
STEP6:   PTGADD    0x1    ;ADD PTGADJ TO PTGT0LIM
STEP7:   PTGJMPC1  0x00   ;JUMP TO STEP0 IF PTGC1 ! = PTGC1LIM, INCREMENT PTGC1
;  END OUTER LOOP
STEP8:   PTGIRQ    0x4    ;GENERATE IRQ #4
STEP9:   PTGCOPY   0x09   ;COPY HOLD TO PTGT1LIM (RESTORE ORIGINAL PTGT1LIM VALUE)
STEP10:  PTGJMP    0x00   ;JUMP TO START OF QUEUE
```

FIG. 6B

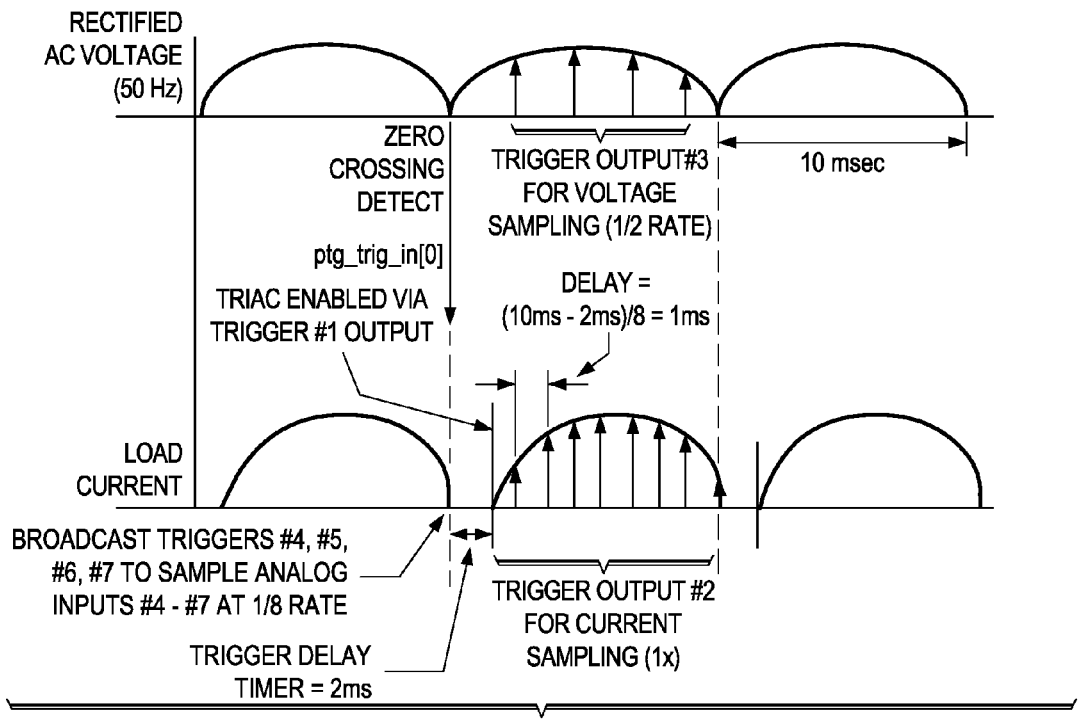

FIG. 7A

STEP COMMANDS IN PTGQUE
STEP0:   PTGWHI    0x0    ;WAIT FOR POS EDGE TRIGGER #0
STEP1:   PTGCTRL   0xC    ;GENERATE OUTPUT TRIGGERS #7,6,5,4 (BROADCAST)
STEP2:   PTGCTRL   0x8    ;START PTGT0, WAIT FOR TIMEOUT
STEP3:   PTGTRIG   0x01   ;GENERATE OUTPUT TRIGGER #1
; START MAIN LOOP
STEP4:   PTGCTRL   0x9    ;START PTGT1, WAIT FOR TIMEOUT
STEP5:   PTGCTRL   0x02   ;GENERATE OUTPUT TRIGGER #2
STEP6:   PTGCTRL   0x03   ;GENERATE OUTPUT TRIGGER #3
STEP7:   PTGCTRL   0x9    ;START PTGT1, WAIT FOR TIMEOUT
STEP8:   PTGCTRL   0x02   ;GENERATE OUTPUT TRIGGER #2
STEP9:   PTGJMPC0  0x04   ;JUMP TO STEP4 IF PTGC0 != PTGC0LIM, INCREMENT PTGC0
; END MAIN LOOP
STEP10:  PTGJMP    0x00   ;JUMP TO START OF QUEUE

FIG. 7B

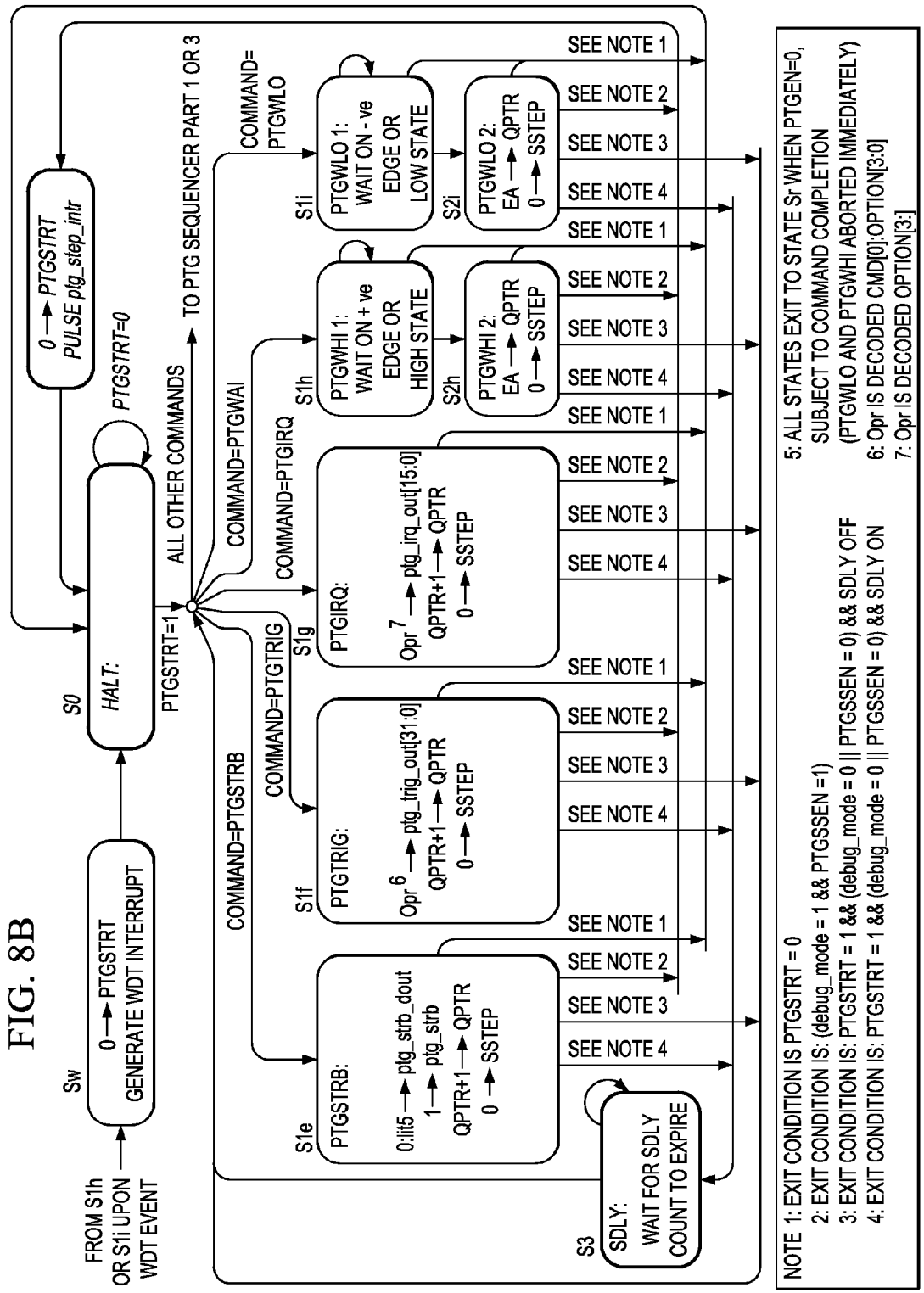

PERIPHERAL TRIGGER GENERATOR

CROSS REFERENCE TO RELATED APPLICATIONS

This application claims priority to U.S. Provisional Application Ser. No. 61/534,619, titled, "Peripheral Trigger Generator," filed Sep. 14, 2011, which is hereby incorporated by reference in its entirety as if fully set forth herein.

TECHNICAL FIELD

The present disclosure relates to a peripheral trigger generator, in particular, for use in a microcontroller.

BACKGROUND

Microcontrollers are used in a variety of control environments. It is often desirable in such environments to accurately generate complex signals, such as triggers for peripheral devices, that vary in time and frequency responsive to internal and external events. Typically, the microcontroller's processing core itself has been used to provide control over generating such signals. However, processor driven timing solutions are subject to processor latencies which cannot necessarily be predicted. This can result in inaccuracies and timing inconsistencies when time-critical events, requiring generation of responsive triggers, occur. Furthermore, to the extent that the processor core can be used to control such timing, the amount of processor overhead may be significant.

As such, there is a need for improved systems and methods for generating signals responsive to time-driven events. There is a further need for improved systems and methods for generating trigger signals to coordinate peripheral actions.

SUMMARY

According to various embodiments, complex and accurate timing sequences can be generated with a peripheral trigger generator, which is adaptable to internal and external events without incurring the unpredictability and latencies of processor driven solutions. A peripheral trigger generator according to various embodiments provides a unique peripheral function that enables users to implement coordinated timing functions not possible with conventional microcontrollers.

A microcontroller according to embodiments includes a central processing unit (CPU); a plurality of peripheral units; and a peripheral trigger generator comprising a user programmable state machine, wherein the peripheral trigger generator is configured to receive a plurality of input signals and is programmable to automate timing functions depending on at least one of said input signals and generate at least one output signal. In some embodiments, the peripheral trigger generator includes a programmable step queue comprising a plurality of registers storing sequential programming steps. In some embodiments, the peripheral trigger generator comprises control registers coupled with a control logic and a command decoder coupled with said step queue. In some embodiments, the at least one output signal is a trigger signal that controls one of said peripheral units independently from said CPU. In some embodiments, the one peripheral unit is an analog-to-digital converter.

A microcontroller, according to some embodiments, includes a central processing unit; a plurality of peripheral devices; and a peripheral trigger generator configured to generate a plurality of trigger and interrupt signals and coordinate timing functions for the plurality of peripheral devices independent of the central processing unit. The peripheral trigger generator may include a programmable state machine for executing peripheral trigger generator commands. The peripheral trigger generator may further include one or more step queues for storing peripheral trigger generator commands. The peripheral trigger generator may include a plurality of control registers coupled with a control logic and a command decoder coupled with said one or more step queues.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 illustrates exemplary control and status registers for a PTG according to an embodiment of the invention.

FIG. 6A and FIG. 6B illustrate an example application using the PTG.

FIG. 7A and FIG. 7B illustrate an example application using the PTG.

FIG. 8A-FIG. 8D illustrate exemplary states of a PTG state machine.

DETAILED DESCRIPTION

Figures 1, 5:
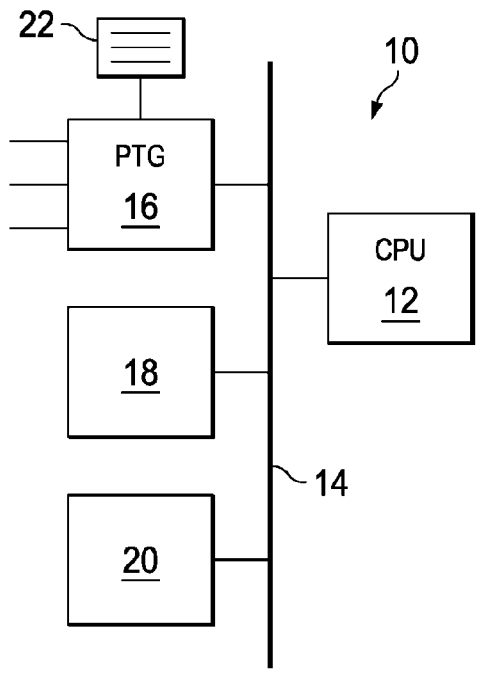
FIG. 1 is a block diagram of a microcontroller in accordance with embodiments of the invention.
FIG. 5 illustrates exemplary STEP queues according to embodiments of the invention.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

According to various embodiments, systems and methods can be provided to generate accurate and complex sequences of signals within a microcontroller to trigger, for example, an ADC (Analog Digital Converter) module to sample and convert analog signals in an application circuit. Using typical software methods is generally too imprecise and requires too much processor overhead. A peripheral trigger generator (PTG) according to various embodiments allows, without CPU intervention, events that occur in a peripheral to (1) Conditionally generate trigger(s) in another peripheral that vary in time and frequency; and (2) Reconfigure the operation of another peripheral (e.g. ATD input channel select).

In some embodiments, the PTG (Peripheral Trigger Generator) is a user programmed state machine designed to "process" time driven events and output trigger signals that coordinate various peripheral actions. In other words, the PTG generates complex sequences of trigger signals in order to coordinate the action of other peripherals. While most microcontrollers process "data," the PTG calculates timing. As will be discussed in greater detail below, the PTG is primarily a "timing coordinator," rather than a timing module. Advantageously, the PTG can reduce processor workload and simplify software design by off-loading time critical tasks, such as triggering ADC sampling and conversions with precise timing; and automating complex applications involving external events and timing such as industrial automation.

As will be explained in greater detail below, in some embodiments, the PTG can support up to 16 independent hardware trigger inputs and one software trigger input and generate up to thirty-two output trigger signals, in either individual or broadcast mode. In addition, in some embodiments, the PTG can generate up to sixteen unique interrupt signals.

The Peripheral Trigger Generator (PTG) according to various embodiments is user programmable via a PTG assembly language. In some embodiments, the PTG operates independently of the processor. The PTG can monitor selected peripheral signaling and generate signaling to other peripherals and/or the processor. The PTG can provide timing accuracy not possible if implemented in software. The PTG may operate faster than the CPU. Consequently, the PTG can monitor a number of inputs and generate complex timing sequences with a time accuracy not possible via software.

More particularly, turning now to FIG. 1, a diagram of an exemplary processor 10 employing a peripheral trigger generator in accordance with embodiments is shown. The processor 10 may be implemented as a microprocessor or microcontroller, or any suitable processing device. The processor 10 includes one or more central processing units 12 coupled via a bus 14 to one or more peripheral devices 18, 20. In addition, as will be explained in greater detail below, the processor 10 includes a peripheral trigger generator 16 in accordance with embodiments for generating complex timing signals for both on-chip and off-chip peripherals. One or more control registers may be provided to control operation of the PTG 16. In some embodiments, the peripheral devices can include ADCs, Input Capture, Output Compare, and Timers.

Figure 2:
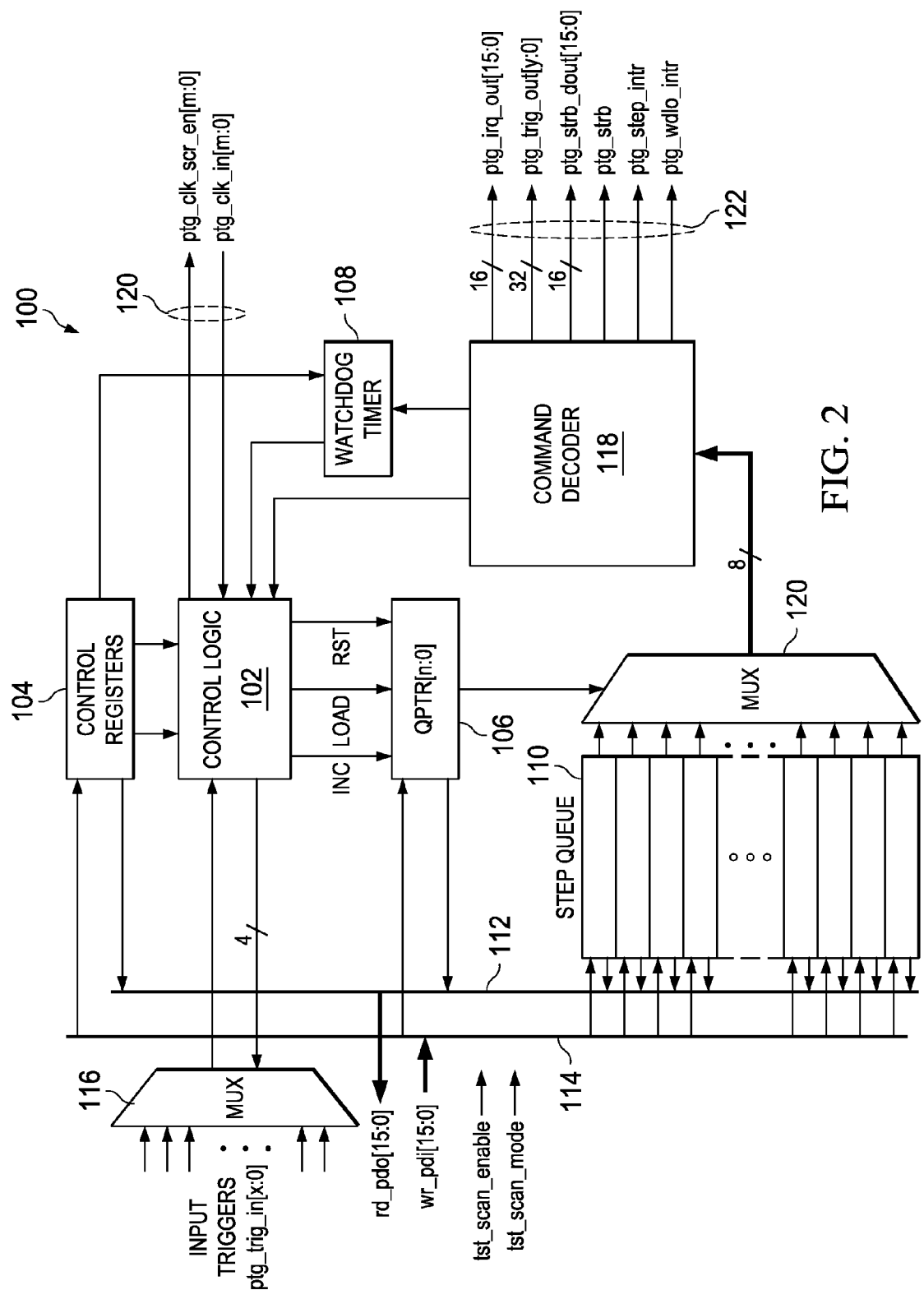
FIG. 2 is a block diagram of a peripheral trigger generator according to an embodiment of the invention.

Turning now to FIG. 2, a diagram of an exemplary PTG is shown and generally identified by the reference numeral 100. In the example illustrated, the PTG 100 includes a STEP queue 110 coupled to a read bus 112 and a write bus 114. The STEP queue 110 is a small memory containing the instructions needed to implement the desired user functionality.

A multiplexer 116 selects input signals that may be used to start or modify the program behavior in the STEP queue 110. The PTG 100 may receive inputs from external pins, analog comparators, pulse width modulator (PWM) timebase comparators; Output Compare events; Input Capture events; and ADC (analog to digital conversion) complete signals.

The PTG 100 further includes one or more control registers 104, control logic 102, a queue pointer (QPTR) 106, watchdog timer 108, and command decoder 118. The command decoder 118 converts executed STEP command into actions (signals) that can be connected to other modules (not shown) such as ADCs, Input Capture, Output Compare, Timers, or external device pins. According to a particular embodiment, the PTG 100 may comprise the following outputs: ADC trigger inputs; PWM sync inputs; Input Capture sync; Output compare clock input; Output compare sync input; and Analog comparator mask signal inputs.

Although any number of control and status registers may be used in conjunction with the PTG, according to some embodiments, the control and status registers 104 are: PTG Control/Status register (PTGCST); PTG control register (PTGCON); PTG broadcast trigger enable (PTGBTE); PTG hold register (PTGHOLD); PTG GP timer 0 register (PTGT0LIM); PTG GP timer 1 register (PTGT1LIM); PTG step delay register (PTGSDLIM); PTG Loop Counter0 (PTGC0LIM); PTG Loop Counter 1 (PTGC1LIM); PTG adjust register (PTGADJ); PTG Literal register (PTGL0); PTG queue pointer (PTGQPTR).

Figure 3:
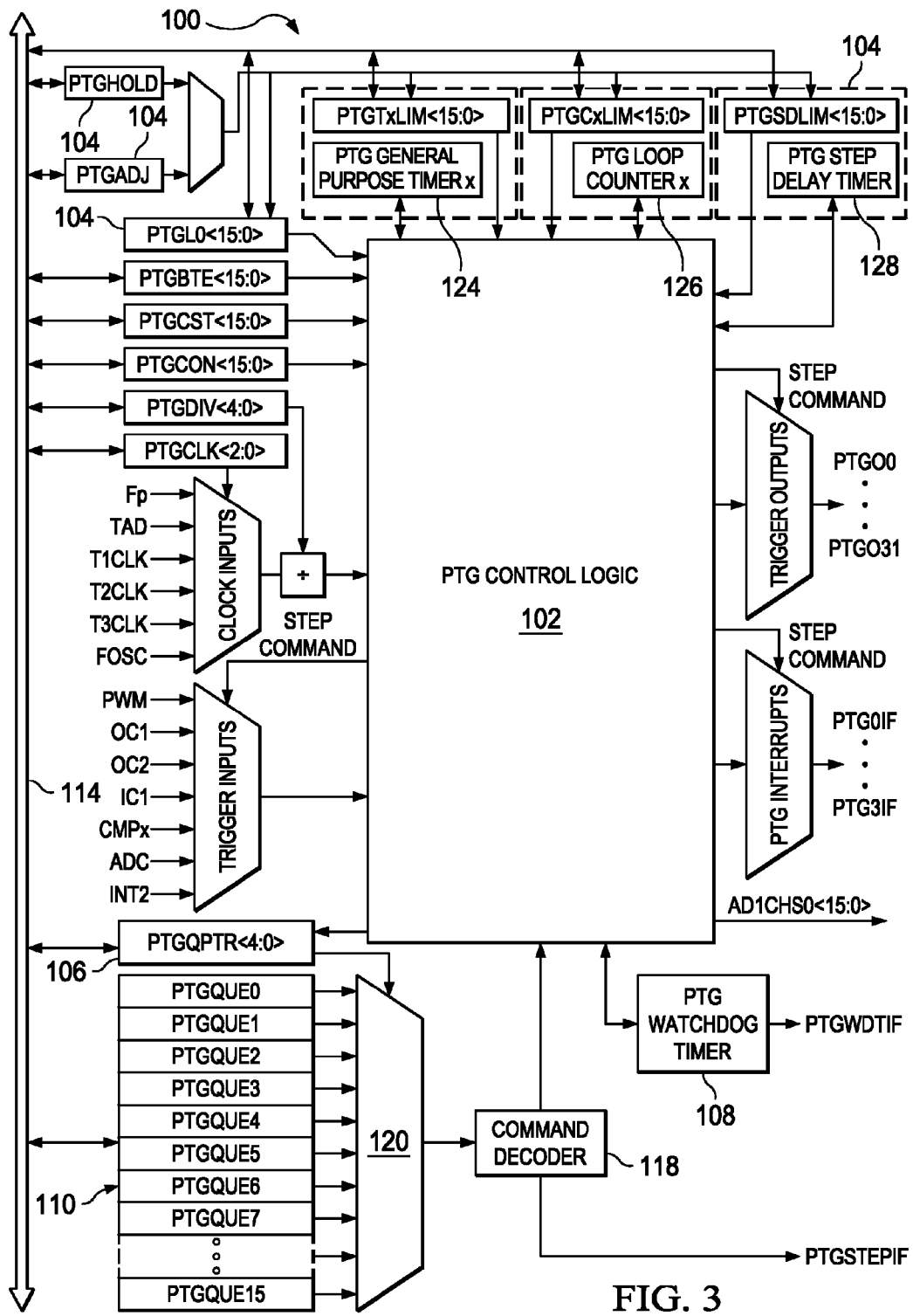
FIG. 3 is a block diagram of a peripheral trigger generator according to an embodiment of the invention.

These are illustrated in greater detail with reference to FIG. 3. In addition, as will be explained in greater detail below, in some embodiments, the PTG 100 includes one or more general purpose timers 124, one or more loop counters 126, and one or more delay timers 128.

In operation, according to some embodiments, the user writes 8-bit commands called "Steps" into the PTG queue registers 110. Each 8-bit step is made up of a four bit command code and a four bit parameter field. FIG. 4 illustrates the structure and encoding of a step command. The commands perform operations such as wait for an input trigger signal, generate an output trigger signal, and wait for the timer. More particularly, the commands define a sequence of events that generate trigger output signals 122 to peripherals such as the ADC, Output Compare, Input Capture, and the Timer macros. The STEP commands may also be used to generate interrupt requests to the processor.

STEP commands in the STEP queue 110 execute sequentially unless stopped by, e.g., a reset or by the Watchdog Timer 108. In addition, the STEP commands can be made to wait on a command, such as an input trigger edge, a software trigger, or a timer match, before continuing. The STEP queue pointer register 106 is a special function register and an internal pointer. The pointer addresses the currently active step in the step queue 110. Each command byte is read, decoded, and executed sequentially.

While most instructions execute with predefined cycle count, the watchdog timer 108 is enabled during input trigger related step commands (all other commands execute and retire in 2 cycles). The WDT 108 is a free running, 9-bit counter that is reset when each step command retires (completes). During each PTG cycle, the WDT compares its value with a user selected timeout value, and will generate a WDT interrupt (ptg_wdto_intr), and halt step command execution should they ever match. The WDT 108 is intended to prevent PTG lock-up should an expected input trigger event never arrive.

The PTG module 100 can generate trigger, interrupt, and strobed data outputs by execution of specific Step commands. As noted above, the PTG module can generate up to 32 unique trigger output signals, in either an individual or broadcast mode. The PTG module can generate an individual output trigger on any one of the 32 trigger outputs. The individual trigger outputs are typically used to trigger individual ADC input conversion operations, but can be assigned to any function, including general purpose I/O ports. When the PTG module 100 is used with a compatible peripheral, such as the ADC module, the individual trigger output signals of the PTG 100 are individually assigned to specific analog input conversion controllers within the ADC module (not shown). The broadcast trigger output feature enables the user to simultaneously generate large number of (individual) trigger outputs with a single Step command.

In some embodiments, two 16-bit Loop Counters 126 are provided that may be used by the as a block loop counter or delay generator. All internal counters are cleared when the device is in the reset state or when the PTG module 100 is disabled. Step commands exist that can load, modify or initialize the Loop Counter limit values. Each Loop Counter includes an incrementing counter (PTGCn) and an SFR limit register (PTGCnLIM). The SFR value may be changed by a CPU write (when the module is disabled) or by the PTG sequencer (when the module is enabled). The stored value in the SFR that corresponds to each Loop Counter is referred to as the counter limit value.

The jump conditional command uses one of the Loop Counters to keep track of the number of times the command is executed, and may therefore be used to create code block loops. These are useful in applications where a sequence of peripheral events needs to be repeated several times. The jump command allows this to be achieved without requiring a large step queue to be implemented on the device.

Each time the jump command is executed, the corresponding internal Loop Counter is compared to its limit value. If the counter has not reached the limit value, the target jump queue location is loaded into the step Queue Pointer (PTGQPTR) 106, and the counter is incremented by 1. The next command will be fetched from the new queue location. If the counter has reached the limit value, the sequencer will proceed to the next command (i.e. increment the queue pointer) as usual. In preparation for the next jump command loop, the corresponding Loop Counter will also be cleared at this time. The provision for two separate Loop Counters and associated jump (PTGJMPCn) instructions allows for nested loops to be supported (one level deep). There are no restrictions with regards to which PTGJMPCn instruction resides in the inner or outer loops.

STEP commands are illustrated in FIG. 5. In some embodiments, each command in encoded into two four bit fields that make "hand assembly" of commands by a user a relatively simple task. In some embodiments, each 8-bit step command consists of a 4-bit command field (CMD[3:0]) and a 4-bit parameter field (OPTION[3:0]).

In some embodiments, all commands execute in a single cycle, except for flow change commands, and commands that are waiting for an external input. The sequencer is simply pipelined such that while a command is executing, the next command is being read from the step queue and decoded.

By default, each STEP command will execute in one PTG clock period. There are several techniques to slow the execution of the step commands:
  Wait for a Trigger Input
  Wait for a GP Timer (PTGTnLIM)
  Insert a delay loop using PTGJMPCn and PTGCn
  Enable and (automatically) insert a Step Delay after execution of each command In some embodiments, the PTG 100 can support up to 16 independent trigger inputs. The user may specify a step command that waits for a positive or negative edge, or a high or low level, of the selected input signal to occur. The operating mode is selected by a PTGITM[1:0] control field in the PTGCST register. The PTGWHI command looks for a positive edge or high state to occur on the selected trigger input. The PTGWLO command looks for a negative edge or low state to occur on the selected trigger input. PTG command sequencer will repeat the trigger input command (i.e. effectively wait) until the selected signal becomes valid before continuing step command execution. The minimum execution time of a "Wait for Trigger" command is one PTG clock. There is no limit to how long the PTG will wait for a trigger input (other than that enforced by the watchdog timer 108).

In some embodiments, there are 4 input trigger command operating modes supported that are selected by the PTGITM [1:0] control field in the PTGCST register. Note that if the Step Delay is disabled, modes 0 and 1 are equivalent in operation, and modes 2 and 3 are equivalent in operation.

Mode 0 is Continuous edge detect with Step Delay at exit. In this mode, the selected trigger input is continuously tested starting immediately when the PTGWHI or PTGWLO command is executed. When the trigger edge is detected, command execution completes. If the Step Delay counter 128 is enabled, the Step Delay will be inserted (once) after the valid edge is detected and the command execution has completed. If the Step Delay counter is not enabled, the command will complete after the valid edge is detected, and execution of the subsequent command will commence immediately.

Mode 1 is Continuous edge detect with no Step Delay at exit. In this mode, the selected trigger input is continuously tested starting immediately when the PTGWHI or PTGWLO command is executed. When the trigger edge is detected, command execution completes.

Irrespective of whether the Step Delay counter 126 is enabled or not, the Step Delay will not be inserted after command execution has completed.

Mode 2 is Sampled level detect with Step Delay at exit. In this mode, the selected trigger input is sample tested for a valid level. Starting immediately when the PTGWHI or PTG-WLO command is executed, and the trigger input is tested (once per PTG clock). If found not to be true and the Step Delay is enabled, the command waits for the Step Delay to expire before testing the trigger input again. When the trigger is found to be true, command execution completes and the Step Delay is inserted once more. If found not to be true and the Step Delay is disabled, the command immediately tests the trigger input again during the next PTG clock cycle. When the trigger is found to be true, command execution completes and execution of the subsequent command will commence immediately.

Mode 3 is Sampled level detect without Step Delay at exit. In this mode, the selected trigger input is sample tested for a valid level. Starting immediately when the PTGWHI or PTG-WLO command is executed, and the trigger input is tested (once per PTG clock). If found not to be true and the Step Delay is enabled, the command waits for the Step Delay to expire before testing the trigger input again. When the trigger is found to be true, command execution completes and execution of the subsequent command will commence immediately. The Step Delay is not inserted. If found not to be true and the Step Delay is disabled, the command immediately tests the trigger input again during the next PTG clock cycle. When the trigger is found to be true, command execution completes and execution of the subsequent command will commence immediately.

In some embodiments, the user may specify a step command to wait for a software generated trigger. The software generated trigger is generated by setting a bit in the PTGCST register. The PTGCTRL SWTRGE command is sensitive only to the 0 to 1 transition of the PTGSWT bit. This transition must occur during command execution, otherwise the command will continue to wait (with PTGSWT in either state). The PTGSWT bit is automatically cleared by hardware upon completion of the PTGCTRL SWTRGE command, initializing the bit for the next software trigger command iteration. The PTGCTRL SWTRGL command is sensitive to the level of the PTGSWT bit. The command will wait until it observes PTGSWT=1 at which time it will complete. It will complete immediately should PTGSWT=1 upon entry to the command. If desired, the PTGSWT bit may be cleared by the user upon completion of the PTGCTRL SWTRGL command.

The use of the PTGSWT bit in conjunction with a PTG step command that generates interrupt requests to the processor (PTGIRQ), allows the user to coordinate activity between the PTG module 100 and the application software.

In some embodiments, there are two general purpose timers 124 (PTGT1, PTGT0) that may be used by the sequencer to wait for a specified period of time. All timers are cleared when the device is in the reset state or when the PTG module is disabled. Step commands exist that can load, modify or initialize the GP Timers. Each GP Timer 124 consists of an incrementing timer (PTGTn) and an SFR limit register (PTGTnLIM). The SFR value may be changed by a CPU write (when the module is disabled) or by the PTG sequencer (when the module is enabled). Data read from the SFR will depend upon the state of the Internal Visibility (PTGIVIS) bit.

When operating, the timers increment on the rising edge of the PTG clock (which is defined in the PTGCST register). The user can specify a wait operation using a GP timer by executing the appropriate PTGCTRL PTGTn command (wait for selected GP timer[n]).

The stored value in the SFR that corresponds to each GP Timer 124 is referred to as the timer limit value. The wait step command is stalled in state S1x until such time that the timer reaches its limit value, at which point the command will complete and the next command will start. The timer is also cleared at this time in preparation for its next use.

The Step Delay Timer (SDLY) 128 is a convenient method to make each step command take a specified amount of time. Often, the user will specify a step delay equal to the duration of a peripheral function such as the ADC conversion time. The step delay enables the user to generate trigger output signals at a controlled rate so as not to overload the target peripheral.

The PTGSDLIM register defines the additional duration of each step command in units of PTG clocks. The Step Delay Timer is disabled by default. The user can enable and disable the Step Delay Timer via the PTGCTRL SDON or PTGCTRL SDOFF commands that may be placed into the step queue.

When operating, the Step Delay Timer will increment at the PTG clock rate defined in the PTGCST register. The stored value in the PTGSDLIM SFR is referred to as the timer limit value. The Step Delay is inserted after each command is executed such that all step commands (using the Step Delay) are stalled until the PTGSD timer reaches its limit value, at which point the command will complete and the next command will start. The timer is also cleared during execution of each command, such that it is ready for the next command.

As noted above, the PTG module 100 can generate trigger, interrupt and strobed data outputs through the execution of specific step commands.

In some embodiments, the PTG 100 can generate a total of (up to) 32 unique output trigger signals as Individual or Broadcast outputs. The module can generate an individual trigger on any one of 32 trigger outputs using the PTGTRIG command. The individual output triggers are typically used to trigger individual ADC input conversion operations, but may be assigned (in the top-level device DOS) to any function, including GP I/O ports. When the PTG module is used with a compatible peripheral, the individual trigger output signals of the PTG 100 are individually assigned to specific analog input conversion controllers within the ADC module.

The broadcast output trigger capability is specified by the PTGBTE register. Each bit in the PTGBTE register correspond to an associated individual trigger output on the low order half of the trigger bus (ptg_trig_out[(PTG_NUM_TRIG_OUT-1):0]). If a bit is set in the PTGBTE register and a broadcast trigger step command (PTGCTRL BTRIG) is executed, the corresponding individual trigger output is asserted. The trigger broadcast capability enables the user to simultaneously generate large numbers of trigger outputs with a single step command.

The PTG module 100 can generate a total of up to 16 unique interrupt request signals. The interrupt request signals are useful for interacting with the application software to create more complex functions. The module can generate an individual IRQ pulse on the IRQ bus using the PTGIRQ step command.

The PTG 100 supports a strobed data port that accepts data from several sources from within the module. A typical implementation would connect the strobe bus to an ADC channel select input port, connecting as many strobe bus bits as there are channels. The PTG command sequence could then directly select which ADC channel to convert.

The PTGSTRB command zero extends the LS 5-bits of command to 16-bits, then outputs the 16-bit value onto the ptg_strb_dout[15:0] data bus together with a strobe signal. The literal data is embedded within the command, so each PTGSTRB command instance may contain a different literal value.

The PTGCTRL STRBL0 command will write the contents of the PTGL0 register onto the ptg_strb_dout[15:0] data bus together with a strobe signal. The PTGL0 register may be modified using the PTGADD and PTGCOPY commands. The PTGCTRL STRBC0 command will write the contents of the PTGC0 loop counter register onto the ptg_strb_dout[15:0] data bus together with a strobe signal. The PTGCTRL STRBC1 command will write the contents of the PTGC1 loop counter register onto the ptg_strb_dout[15:0] data bus together with a strobe signal.

All trigger, IRQ and Data Strobe outputs are internally asserted by the PTG state machine 102 when the corresponding step command starts (i.e. before any additional time specified by the Step Delay Timer) on the rising edge of the PTG execution clock. When operating in pulsed mode (PTG-TOGL=0), the width of the trigger output signals is determined by the PTGPWD[3:0] bit field in the PTGCON register, and may be any value between 1 and 16 PTG clock cycles. The default value is 1 PTG clock cycle. When globally controlled by the PTGCTRL BTRIG broadcast trigger command, the TRIG output pulse width is determined by a PTGPWD[3:0] bit field in the PTGCON register, and may be any value between 1 and 16 PTG clock cycles. The default value is 1 PTG clock cycle.

The strobe data outputs are asserted by the PTG state machine at the beginning of the first PTG execution clock of the corresponding data strobe step command before any additional time specified by the Step Delay Timer. The strobe clock signal (ptg_strb) is initiated by the state machine at the same time.

Figure 6A:
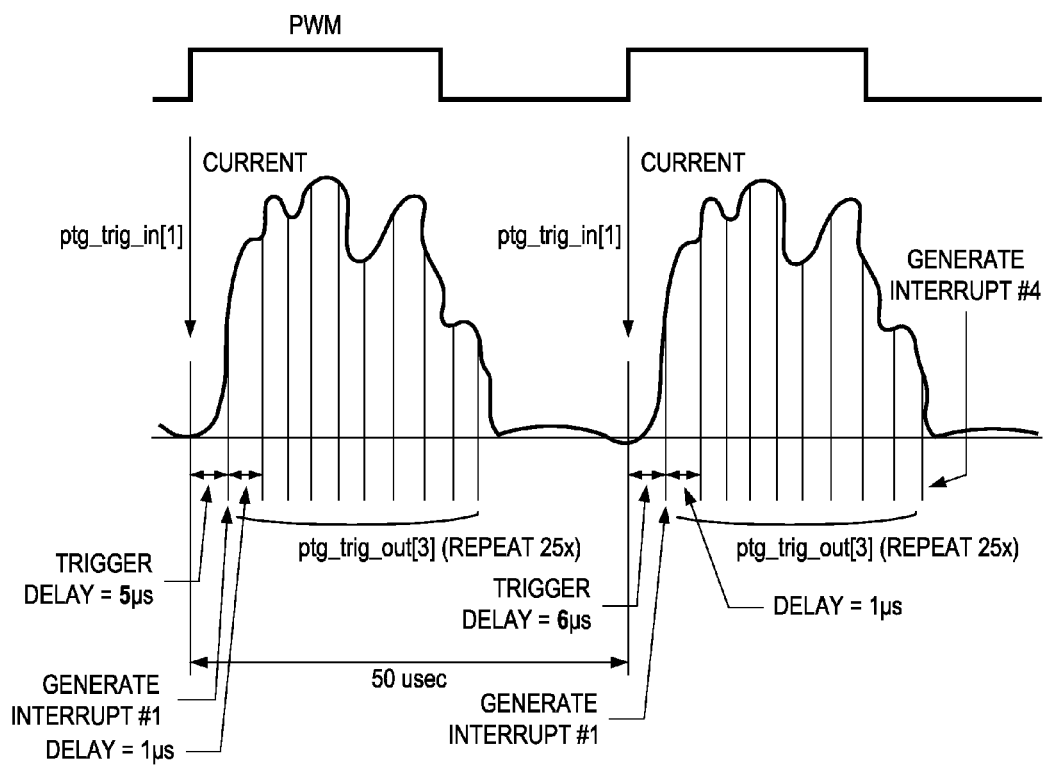
Figure 8A:
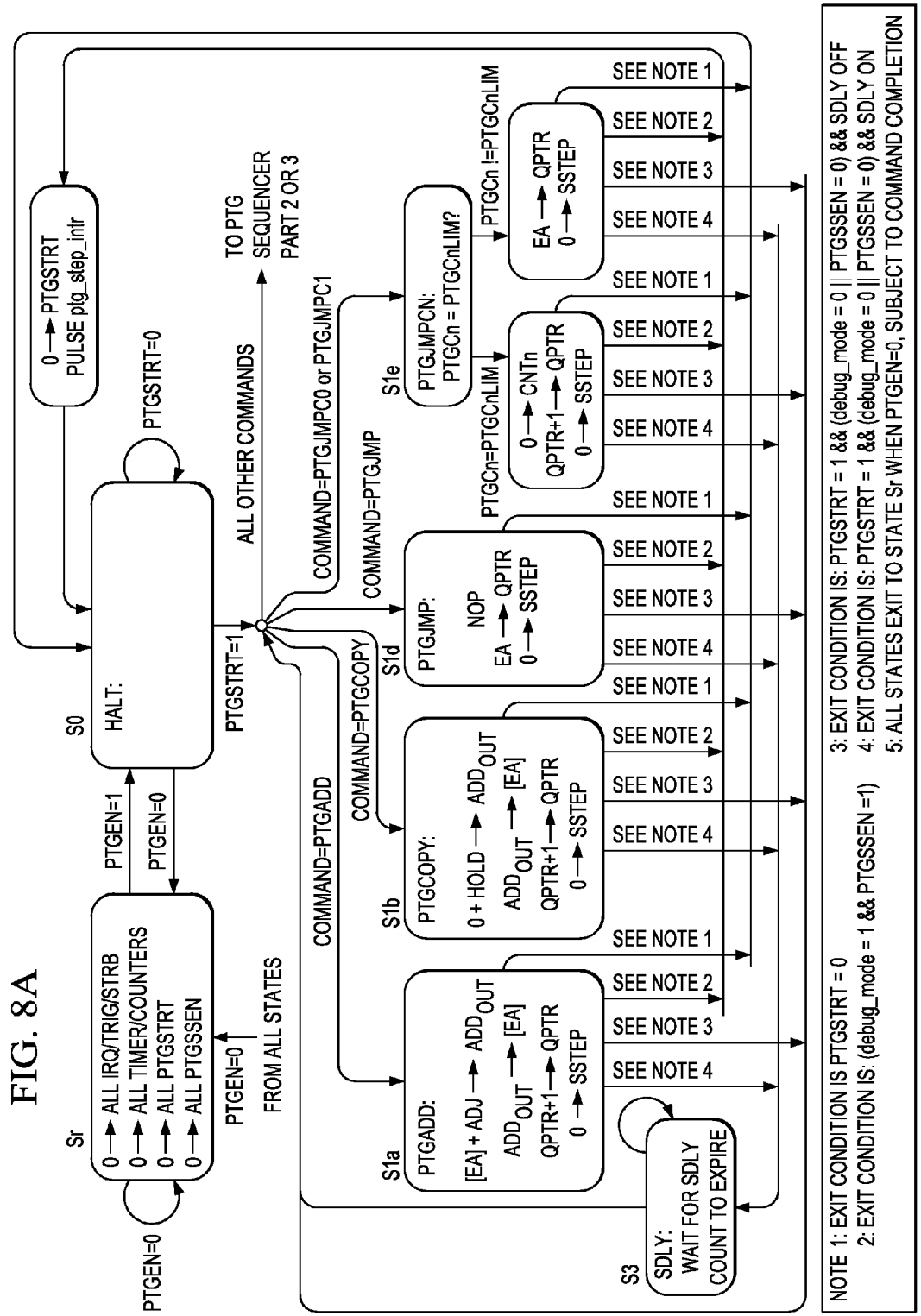
Figure 8C:
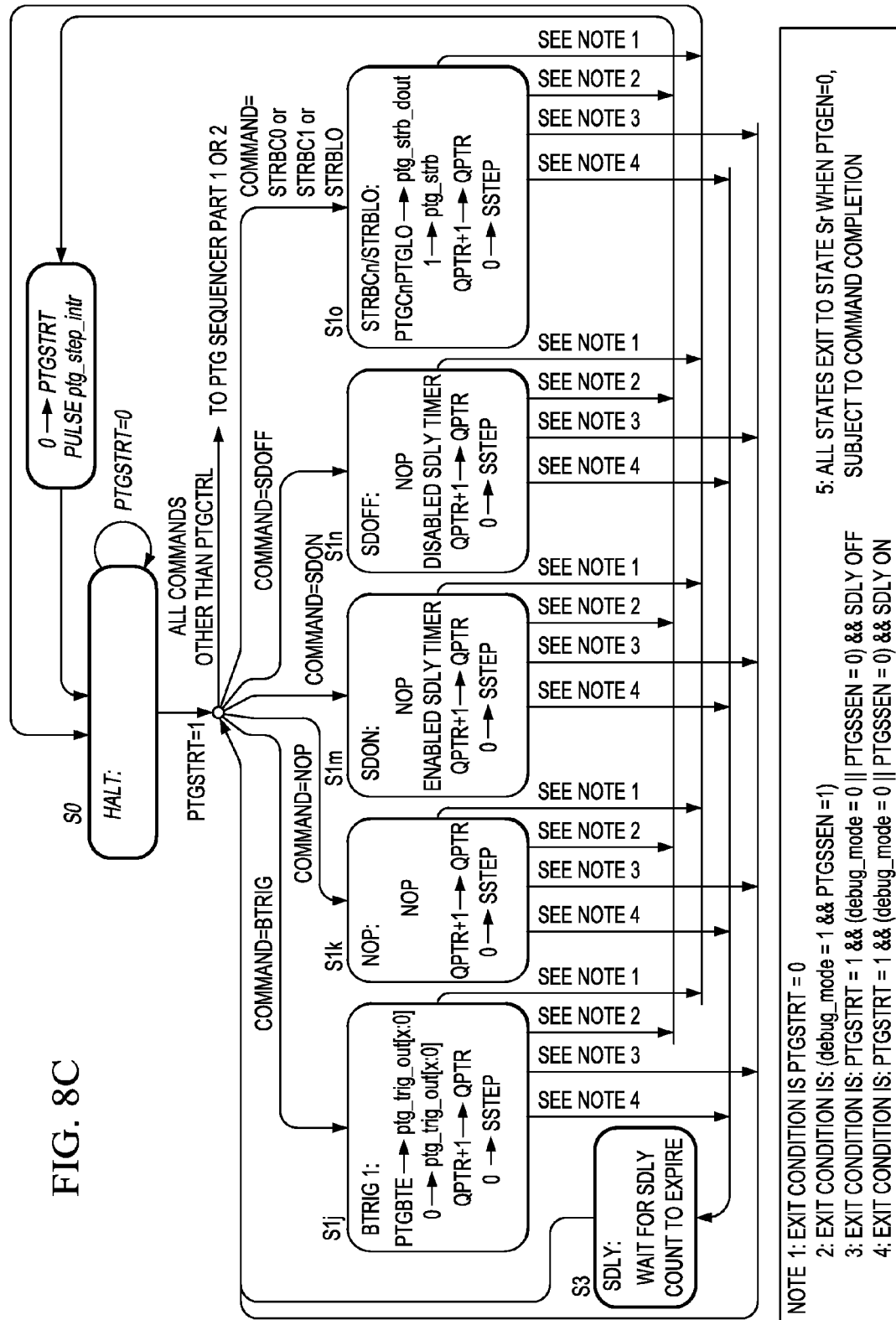
Figure 8D:
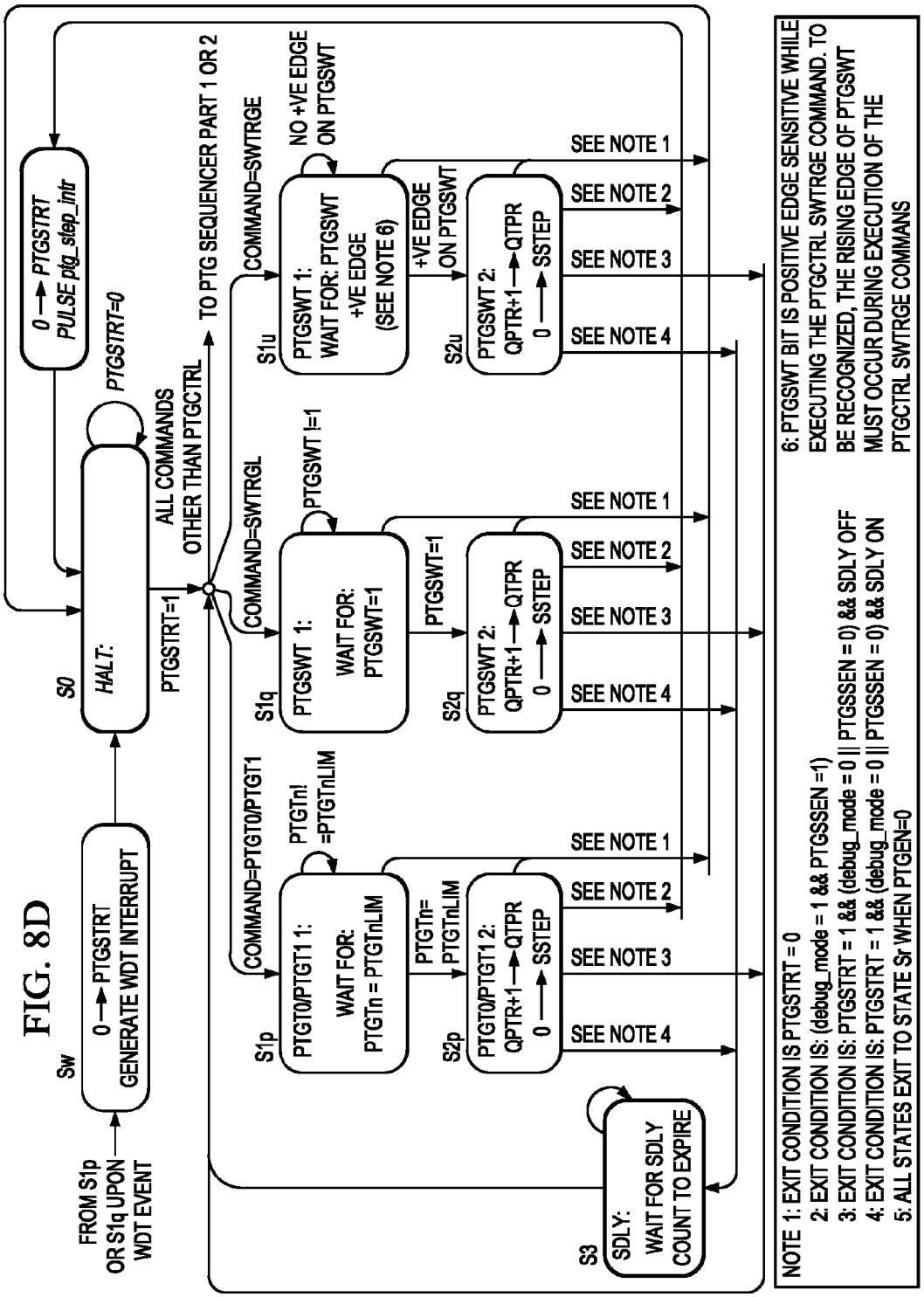

Operation of embodiments is shown by way of example. In particular FIG. 6 illustrates timing for interleaving samples over multiple cycles. FIG. 6A shows an application where the customer needs to accurately measure the power in a system where the current load is highly dependent on temperature, voltage, and end consumer application. The current waveforms vary widely per customer usage, but over a few pwm cycles, the waveform is relatively stable.

The goal is to take many current and/or voltage readings over several pwm cycles in an interleaved manner. The data is stored in the device system memory during acquisition and is later post processed (integrated) to yield an accurate power value. This example shows a situation where it would not be practical or possible for software to accurately schedule the ADC samples.

Exemplary STEP programming for the timing sequence of FIG. 6A is shown in FIG. 6B. In the program illustrated, the following assumptions are made:
 1. Trigger input #1 is connected to the PWM signal. This rising edge of the PWM signal starts the sequence.
 2. Output trigger #3 is connected to the ADC. This signal commands the ADC to begin a sample and conversion process.
 3. Interrupt #1 is used to signal the processor that a sub sequence has started, (provides status)
 4. Interrupt #4 is used to signal the processor that the complete sequence has completed.
 5. The ADC clock is selected as the PTG clock source.
 6. The ADC clock is 14 MHz.
 7. The initial trigger delay is 5 μs.
 8. The 2nd trigger delay is 6 μs.
 9. In each PWM cycle, the ADC will be triggered 25 times.
 10. The basic sequence is run twice.
 Initialize the following control registers:
 PTGT0LIM=$70_{10}$ (5 μs×14 clks/μs)
 PTGT1LIM=$11_{10}$ ([1 μs×14 clks/μs]−3 step clocks)
 PTGC0LIM=$24_{10}$ (total of 25 inner loop iterations)
 PTGC1LIM=1 (total of 2 outer loop iterations)
 PTGHOLD=$70_{10}$ (5 μs×14 clks/μs)
 PTGADJ=$14_{10}$ (1 μs×14 clks/μs)
 PTGSDLIM=0 (no step delay)
 PTGBTE=0x0000 (no broadcast triggers)
 PTGQPTR=0 (start of step queue)
 PTGCST=0x8200 (after PTGQPTR is initialized)

Another application example (for sampling at multiple rates) is shown in FIG. 7A. In this application, the goal is to sample one ADC input at a fast rate (1× rate), a second analog input at a slower rate (one-half rate), and analog inputs #3-#7 at a one-eighth rate. The example is a motor control application using an SCR (Silicon Controlled Rectifier) which triggers at a specified time after the AC line zero crossing. While this example uses simple binary sampling ratios, the PTG can generate a very wide range of sample ratios to meet the requirements of an application.

Exemplary STEP programming for the timing sequence of FIG. 7A is shown in FIG. 7B. In the program illustrated, the following assumptions are made:
 1. Trigger input #0 is connected to the zero crossing detect. This rising edge of the zero crossing detect signal starts the sequence.
 2. The trigger delay from trigger in #0 to the generation of trigger #1 output is 2 ms.
 3. Trigger output #1 enables the SCR in the application circuit.
 4. Trigger output #2 is connected to the ADC to trigger sampling of the current measurement at 1 ms intervals.
 5. Trigger output #3 is connected to the ADC to trigger sampling of the supply voltage measurement at 2 ms intervals.
 6. Trigger outputs #4, #5, #6, and #7 are connected to the ADC to sample other data values once per cycle.
 7. The ADC clock is selected as the PTG clock source.
 8. The ADC clock is 14 MHz.
 Initialize the following control registers:
 PTGT0LIM=$28000_{10}$ (2 ms×14 clks/μs)
 PTGT1LIM=$14000_{10}$ (1 ms×14 clks/μs)
 PTGC0LIM=$24_{10}$ (total of 25 inner loop iterations)
 PTGC1LIM=1 (total of 2 outer loop iterations)
 PTGHOLD=0 (not used)
 PTGADJ=0 (not used)
 PTGSDLIM=0 (no step delay)
 PTGBTE=0x00F0 (enable broadcast triggers 4-7)
 PTGQPTR=0 (start of step queue)
 PTGCST=0x8200 (after PTGQPTR is initialized)

Because each step command takes at least two clocks, for more accurate timing, the PTGTDLY register should be programmed with a value that compensates for the delay of the wait for trigger command and the generate triggers #4-7 command, and the wait for trigger delay command. Therefore, the PTGTDLY initialization value really should be 28,000−6=27,994. Likewise, the PTGTMR register value should also be slightly smaller value of 14,000−4=13,996.

The PTG finite state machine (FSM) based sequencer implemented in the control logic 102 is shown in FIGS. 8A-8D. States shown are defined by bits or settings in the PTGCON control register. The sequencer is clocked by the PTG clock as defined by the PTGCLK[2:0] clock source selection and PTGDIV[4:0] clock divider control bits. The sequencer advances one state on the positive edge of each clock. The sequencer will enter state S0 (HALT) under any of the following conditions:
 1. PTGEN=0
 2. WDT event (via state Sw)
 3. PTGSTRT=0
 4. Operating in debug mode && PTGSSEN=1 && exiting the last state of a command The sequencer will remain in S0 while PTGSTRT=0.

The sequencer is forced into state Sr when reset_n=0. If the module is disabled by the user (PTGEN=0) but not reset (reset_n=1), the sequencer is also forced into Sr, but only after the current command has completed. An exception to this rule applies to states that are conditionally waiting for an event. These states are exited immediately should PTGEN be cleared. That is, the following commands do not complete and exit immediately should the module be disabled by the user:
PTGWLO and PTGWHI
PTGCTRL SWTRGL
PTGCTRL SWTRGE
PTGCTRL PTGT0 and PTGCTRL PTGT1
These same set of commands are also exited immediately when waiting for input and the user aborts the operation by clearing PTGSTRT. This applies irrespective of device or module operating mode.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A microcontroller comprising:
a central processing unit (CPU);
a plurality of peripheral units coupled with said CPU; and
a peripheral trigger generator and operating independently from the CPU and being coupled with the plurality of peripheral units, wherein the peripheral trigger generator comprises a state machine which is programmable via said CPU by a plurality of sequential programming steps, wherein the peripheral trigger generator is configured to receive a plurality of input signals and depending on a programming of the state machine selects at least one of said plurality of input signals and independent from the CPU controls a function of a selected one of said plurality of peripheral units depending on the selected input signal and the programming of the state machine, wherein the state machine generates at least one output signal to control the function of the selected peripheral unit.

2. The microcontroller according to claim 1, wherein the state machine of the peripheral trigger generator comprises control logic receiving said selected input signal, a programmable step queue controlled by said control logic and comprising a plurality of registers storing said sequential programming steps and a command decoder coupled with the control logic and operable to receive the sequential programming steps and to generate the at least one output signal.

3. The microcontroller according to claim 2, wherein the peripheral trigger generator comprises a timer controlled by a timer register coupled with the control logic.

4. The microcontroller according to claim 1, wherein the at least one output signal is a trigger signal that controls one of said peripheral units independently from said CPU.

5. The microcontroller according to claim 4, wherein said one peripheral unit is an analog-to-digital converter.

6. The microcontroller according to claim 1, wherein the sequential programming steps allow for a coding that causes the peripheral trigger generator to wait for a selectable trigger condition of a selected input signal and to execute a following programming step said selected input signal meets the selectable trigger condition.

7. The microcontroller according to claim 6, wherein the selectable trigger condition is selected from the group consisting of a positive edge, a negative edge, a high state, a low state.

8. The microcontroller according to claim 1, wherein the sequential programming steps allow for a coding that causes the peripheral trigger generator before executing a following programming step to wait for an event selected from the group consisting of: a selectable trigger condition of a selected input signal, a software trigger, a timer match.

9. The microcontroller according to claim 8, wherein the software trigger is provided by setting a bit by the CPU in a control register of the peripheral trigger generator.

10. The microcontroller according to claim 1, wherein the sequential programming steps allow for a coding that starts a timer and to execute a following programming step upon a timeout of said timer.

11. The microcontroller according to claim 1, wherein the sequential programming steps allow for a coding that generates an interrupt signal fed to said CPU.

12. The microcontroller according to claim 1, wherein the sequential programming steps allow for a coding that jumps to another programming step when a condition is fulfilled.

13. The microcontroller according to claim 1, wherein the sequential programming steps allow for a coding that generates said at least one output signal.

14. The microcontroller according to claim 1, wherein the sequential programming steps allow for a coding that broadcasts a plurality of output signals.

15. The microcontroller according to claim 1, wherein each programming step of the sequential programming steps comprises a command code and a parameter code.

16. The microcontroller according to claim 1, further comprising a watchdog timer wherein the watchdog timer is reset after completion of a programming step and a timeout of the watchdog timer stops execution of the sequential programming steps.

17. The microcontroller according to claim 16, wherein a timeout of the watchdog timer is programmable.

18. The microcontroller according to claim 16, wherein a timeout of the watchdog timer generates an interrupt fed to the CPU.

19. The microcontroller according to claim 1, wherein the peripheral trigger generator is configured to generate a plurality of output signals for a predefined number of peripheral units, wherein each output signal is generated upon execution of a programming step.

20. The microcontroller according to claim 1, wherein the peripheral trigger generator is configured to further generate a strobed output signal upon execution of a programming step, wherein the strobed output signal comprises a plurality of parallel output signals.

21. The microcontroller according to claim 20, wherein a value of the strobed output signal is provided by a parameter coded within the programming step.

22. The microcontroller according to claim 21, wherein the value has n bits and is extended to a bit width being greater than n.

23. The microcontroller according to claim 21, wherein the strobed output signal is used to select a channel of an analog to digital converter.

24. The microcontroller according to claim 1, wherein the peripheral trigger generator further comprises a programmable delay timer, wherein when enabled the delay defined by the programmable delay timer is inserted during execution of a programming step.

* * * * *